(No Model.)
G. T. WARE.
CAN OPENER.
No. 433,379. Patented July 29, 1890.
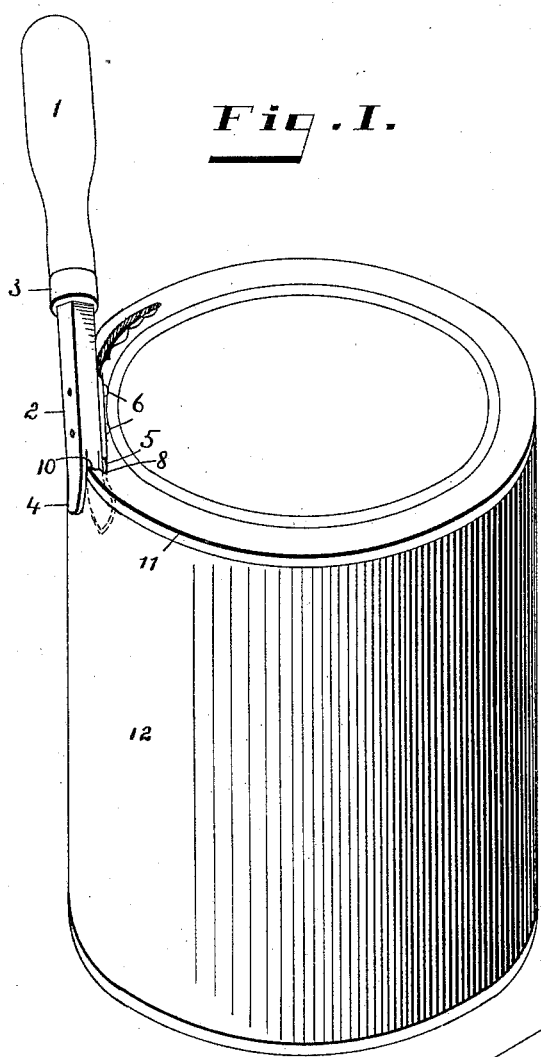
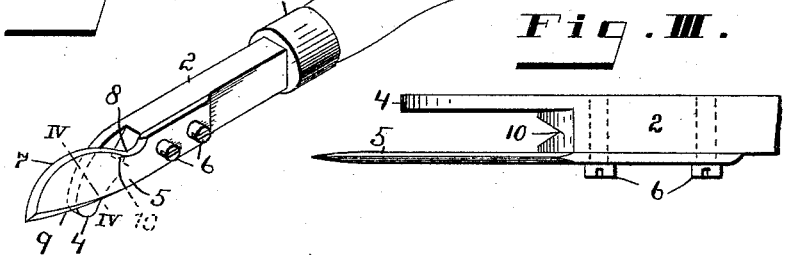
Witnesses:
L. G. Fischer
E. Arthur
Inventor:
Geo. T. Ware
By Wright Bros.
Attys.

UNITED STATES PATENT OFFICE.

GEORGE T. WARE, OF PLEASANT HILL, MISSOURI.

CAN-OPENER.

SPECIFICATION forming part of Letters Patent No. 433,379, dated July 29, 1890.

Application filed March 26, 1890. Serial No. 345,392. (No model.)

*To all whom it may concern:*

Be it known that I, GEORGE T. WARE, of Pleasant Hill, in the county of Cass and State of Missouri, have invented certain new and useful Improvements in Can-Openers, of which the following is a full, clear, and exact description, reference being had to the accompanying drawings, forming part of this specification.

My invention relates to an improvement in can-openers; and my invention consists in features of novelty hereinafter described, and pointed out in the claim.

Figure I is a perspective view of the can, showing the position of the can-opener while in operation. Fig. II is a perspective view of the can-opener. Fig. III is an enlarged detail showing the V-shaped notch or guide. Fig. IV is a sectional view of the blade, taken on line IV IV, Fig. II.

Referring to the drawings, 1 represents the handle, to which the stock 2 is connected by being inserted in one end of the handle, 3 representing a ferrule for strengthening the end of the handle.

4 represents a downwardly-curved guard, located on the forward end and to one side of the stock 2, of which it is an integral part.

5 represents the blade, which is attached to the stock by means of screws 6. The blade is attached to the stock on the opposite side from the guard, a space thus being left between the guard and blade. The blade is mainly formed of a convex portion 7; but near the point to which it is attached to the stock it is formed into a concave portion 8. The back portion of the blade tapers off to a point 9, as shown in Fig. IV, its thickest portion being somewhat above the center of the blade. The object in providing the blade with the tapering back and with the convex concave cutting-face is to prevent the blade from receding when the handle is raised to make a fresh cut, and to cause the blade to cut the tin by the mere action of pressing down on the handle.

In all the can-openers that have come under my observation it has been necessary for the operator to push forward on the same in order to hold it up to the work, while in my device all that is necessary is for the operator to press down on the handle and the peculiar construction of the blade will cause the same to be drawn forward, and thus feed itself.

10 represents a V-shaped notch on the forward end of the stock between the guard and blade. This V-shaped notch acts both as a fulcrum and a guide, the rim 11 of the can 12 extending into said V-shaped notch.

The guard 4 prevents the device from leaving its position to any great degree, if for any reason the rim should pass out of engagement with the guide or V-shaped notch.

I claim as my invention—

In a can-opener, the combination of the handle 1, stock 2, curved guard 4, and blade 5, said stock 2 having a V-shaped fulcrum and guide 10 in its forward end, substantially as described, and for the purpose set forth.

GEORGE T. WARE.

Witnesses:
CRITTENDEN WHALEY,
JOHN F. MCAFEE.